United States Patent Office 3,755,482
Patented Aug. 28, 1973

3,755,482
MULTISTAGE PRODUCTION OF STYRENE
Kenneth R. Nunnally, Brazoria, William M. Castor, Clute, and Robert R. Turley, Lake Jackson, Tex., assignors to The Dow Chemical Company, Midland, Mich.
No Drawing. Filed Mar. 24, 1972, Ser. No. 237,946
Int. Cl. C07c 15/10
U.S. Cl. 260—669 R
3 Claims

ABSTRACT OF THE DISCLOSURE

A process for improving the styrene yield in the catalytic multistage dehydrogenation of ethylbenzene wherein the average temperature of each stage is at least 10° C. higher than the preceding stage.

---

This invention relates to a process for the production of styrene and more particularly relates to an improved process for the production of sytrene by the dehydrogenation of the ethyl benzene.

Several processes have been developed recently wherein styrene has been produced by the multistage dehydrogenation of ethylbenzene with conversions of ethylbenzene to styrene of from 50–85%. Such processes are described in U.S. 3,118,006, U.S. 3,330,878 and U.S. 3,515,763.

With the large plants recently in use and being constructed in the 1970's, small increases in yield can amount to a significant increase in the quantity of styrene produced. For example, a plant operating at a 75% conversion of ethylbenzene and processing $5 \times 10^8$ lbs. ethylbenzene per year, an increase in yield to styrene of 1% would amount to about $.75 \times 5 \times 10^8 \times .01 = 3.75 \times 10^6$ lbs. of additional styrene produced per year. While this is a small increase in yield it is highly significant in terms of additional quantities of product produced.

The improvement in yield to styrene not only offers a direct economical benefit to the producer by such increases in styrene yield but means a decrease in by-products a large portion of which is tars which must eventually be disposed of by methods any of which encompass ecological considerations. Therefore it follows that there are actually two advantages, (1) more product produced per unit of feed and (2) less by-products to be disposed of per unit of feed.

It is an object of the present invention to produce styrene from ethylbenzene by multistage reaction at high conversions while decreasing the yield to by-products thereby increasing the yield to styrene.

It has now been discovered that the yield to styrene can be increased in the multistage catalytic dehydrogenation of ethylbenzene by maintaining the average temperature between each stage at a temperature of at least about 10° C. higher than the average temperature of the preceding stage, preferably from about 10° to about 50° C. and usually from about 15° to about 25° C. higher than the preceding stage.

The improved process of the present invention is applicable to most any reactor design, i.e. heated case, adiabatic, radical etc.

It is well known that the conversion of ethylbenzene to styrene is increased as the temperature is increased; therefore, the overall conversion in the present invention is also temperature dependent. However, for about the same conversion, the present invention produces less by-product and consequently more styrene. In some instances, the conversion of ethylbenzene is increased along with the increased yield to styrene.

The process of the present invention is operated at average temperatures in the range of from about 550° C. to about 700° C. and preferably from about 580° C. to about 650° C. at or about atmospheric pressure i.e. at sufficient back pressures so as to provide the desired flow of materials through the reactor with the lowest possible back pressures being preferred.

The process of the present invention is operated with as few as two and up to about 5 separate stages or zones with about 3 catalytic reaction stages or zones being preferred. Each stage or zone can be housed in a separate shell or all of the stages or zones can be housed in a single shell wherein each stage or zone is separated by known means or methods.

The temperature of each reaction zone can be controlled by any of the well known means, but the method most often employed is by intermediate steam injection between stages.

The following examples are illustrative of the present invention and are not to be construed as to limiting the scope thereof in any manner.

EXAMPLES

Ethylbenzene having a purity of 99% and water were mixed together to achieve the described 1st stage steam to oil (S/O) ratio. This mixture was then passed through a 316 stainless steel 1 inch pipe reactor having a 150 ml. ceramic ¼ inch berl saddle packed preheat zone followed by a catalyst zone of desired volume and composition. The pipe reactor was wrapped with a bead wire heater for maintaining the desired temperature in the reactor. There was employed a series of three such reactors hereinafter referred to as stages. Between the 2d and 3rd stages there was a means for adding additional quantities of water so to alter the S/O ratio. The catalyst zone of each stage was fitted with a means for measuring the average temperature throughout the zone. The reaction conditions and results are given in the following table.

TABLE I

|  | Example 1 | Comparative Experiment A | Example 2 | Comparative Experiment B | Example 3 | Comparative Experiment C |
|---|---|---|---|---|---|---|
| Stage 1 |  |  |  |  |  |  |
| Temp., ° C | 612 | 626 | 593 | 618 | 588 | 603 |
| S/O ratio | 2/1 | 2/1 | 1/1 | 1/1 | 2/1 | 2/1 |
| Catalyst composition | A | A | A | A | A | B |
| Catalyst volume, ml | 70 | 70 | 70 | 70 | 30 | 30 |
| Stage 2 |  |  |  |  |  |  |
| Temp., ° C | 627 | 626 | 619 | 618 | 598 | 602 |
| S/O ratio | 2/1 | 2/1 | 1.5/1 | 1.5/1 | 2/1 | 2/1 |
| Catalyst composition | A | A | A | A | B | B |
| Catalyst volume, ml | 40 | 40 | 40 | 40 | 40 | 40 |
| Stage 3 |  |  |  |  |  |  |
| Temp., ° C | 644 | 626 | 633 | 618 | 612 | 603 |
| S/O ratio | 2/1 | 2/1 | 2/1 | 2/1 | 2/1 | 2/1 |
| Catalyst composition | A | A | A | A | B | B |
| Catalyst volume, ml | 30 | 30 | 30 | 30 | 70 | 70 |
| Average reaction temp., ° C | 628 | 626 | 608 | 618 | 599 | 603 |
| Reaction pressure, p.s.i.g | 5 | 5 | 5 | 5 | 5 | 5 |
| LHSV,[1] ml. of EB/ml. of catalyst/hr | 1 | 1 | 1 | 1 | 1 | 1 |
| Conversion of ethylbenzene, percent | 73.5 | 72.2 | 66.7 | 64.7 | 52.4 | 52.5 |
| Styrene yield, percent | 92.0 | 90.6 | 91.6 | 91.3 | 95.7 | 95.3 |

[1] LHSV=Liquid hourly space velocity.

Catalyst A was composed of the following composition:

| | Percent |
|---|---|
| $Fe_2O_3$ | 87.3 |
| $K_2CO_3$ | 7.2 |
| $Cr_2O_3$ | 2.2 |
| Cement | 3.3 |

The above mixture was calcined before being placed into the reactor.

Catalyst B was composed of:

80% by wt. of a composition comprising
    70.7% $Fe_2O_3$ (40% yellow, 60% red)
    20.0% $K_2CO_3$
    3.0% $V_2O_5$
    3.0% $K_2Cr_2O_7$
    3.3% Cement (portland)
    10.0% graphite
    10.0% Methocel The above mixture was calcined before being placed into the reactor.

We claim:

1. In a process for the multistage catalytic dehydrogenation of ethylbenzene to styrene, the improvement which comprises maintaining the average temperature of each succeeding dehydrogenation stage at least 10° C. above the average temperature of the preceding stage.

2. The process of claim 1 wherein from 2 to about 5 catalytic dehydrogenation stages are employed.

3. The process of claim 2 wherein 3 catalytic dehydrogenation stages are employed.

References Cited

UNITED STATES PATENTS

| | | | |
|---|---|---|---|
| 3,326,996 | 6/1967 | Henry et al. | 260—669 R |
| 3,499,051 | 3/1970 | Tokumitsu et al. | 260—669 R |
| 3,515,763 | 6/1970 | Uitti | 260—669 R |

CURTIS R. DAVIS, Primary Examiner

PO-1050
(5/69)

UNITED STATES PATENT OFFICE
CERTIFICATE OF CORRECTION

Patent No. 3,755,482              Dated Aug. 28, 1973

Inventor(s) Kenneth R. Nunnally, William M. Castor, Robert R. Turley

It is certified that error appears in the above-identified patent and that said Letters Patent are hereby corrected as shown below:

Col. 2, Table I, under Example 3 opposite Catalyst Composition, change "A" to --B--.

Col. 2, Table I, under Comparative Experiment C, opposite Stage 2 Temp., change "602" to --603--.

Signed and sealed this 5th day of November 1974.

(SEAL)
Attest:

McCOY M. GIBSON JR.
Attesting Officer

C. MARSHALL DANN
Commissioner of Patents